United States Patent [19]

Munson et al.

[11] Patent Number: 4,737,793

[45] Date of Patent: Apr. 12, 1988

[54] RADIO FREQUENCY ANTENNA WITH CONTROLLABLY VARIABLE DUAL ORTHOGONAL POLARIZATION

[75] Inventors: Robert E. Munson, Boulder; Ippalapalli Sreenivasiah, Louisville, both of Colo.

[73] Assignee: Ball Corporation, Muncie, Ind.

[21] Appl. No.: 546,309

[22] Filed: Oct. 28, 1983

[51] Int. Cl.[4] .................. H01Q 21/06; H01Q 21/24; H04B 7/10

[52] U.S. Cl. .................. 342/361; 343/700 MS; 343/365; 342/365

[58] Field of Search .................. 343/700 MS, 362, 365, 343/373, 361, 363, 364, 366, 756, 909

[56] References Cited

U.S. PATENT DOCUMENTS

| | | | |
|---|---|---|---|
| Re. 29,911 | 2/1979 | Munson | 343/700 MS |
| 3,478,362 | 11/1969 | Ricardi et al. | 343/769 |
| 3,641,578 | 2/1972 | Spanos et al. | 343/373 X |
| 3,665,480 | 5/1972 | Fassett | 343/754 |
| 3,725,943 | 4/1973 | Spanos | 343/373 X |
| 3,742,506 | 6/1973 | Wilkinson | 343/362 X |
| 3,827,051 | 7/1974 | Foldes | 343/365 X |
| 3,956,699 | 5/1976 | Leahy | 343/365 X |
| 4,051,474 | 9/1977 | Mack et al. | 343/362 |
| 4,067,016 | 1/1978 | Kaloi | 343/700 MS |
| 4,088,970 | 5/1978 | Fassett et al. | 343/373 X |
| 4,125,837 | 11/1978 | Kaloi | 343/700 MS |
| 4,125,838 | 11/1978 | Kaloi | 343/700 MS |
| 4,125,839 | 11/1978 | Kaloi | 343/700 MS |
| 4,442,590 | 4/1984 | Stockton et al. | 29/571 |

OTHER PUBLICATIONS

"Diode Phase Shifters for Array Antennas," by Joseph F. White, 1974; IEEE Transactions on Microwave Theory and Techniques, vol. MTT-22, No. 6, pp. 2-20.
"Broadband Diode Phase Shifters," by Robert V. Garver, 1971, HDL-TR-1562; Harry Diamond Laboratories, pp. 3-29.

*Primary Examiner*—Theodore M. Blum
*Assistant Examiner*—John B. Sotomayor
*Attorney, Agent, or Firm*—Gilbert E. Alberding

[57] ABSTRACT

A controllable dual input/output port power divider coupled with a controllable phase shifter feed a dual ported dual polarized microstrip antenna structure. By controlling the power divider and phase shifter, arbitrary orthogonal polarization (e.g., linear, circular or elliptical) radiated r.f. fields are obtained. Virtually the entire structure comprising the dual port power divider, phase shifter and microstrip radiator may be formed of shaped photo-chemically etched microstrip conductors disposed a very short distance (e.g., less than one-tenth wavelength) above a conductive reference surface.

18 Claims, 2 Drawing Sheets

RADIO FREQUENCY ANTENNA WITH CONTROLLABLY VARIABLE DUAL ORTHOGONAL POLARIZATION

This invention relates to a dual orthogonally polarized radio frequency antenna assembly, preferably implemented in microstrip form. More particularly, it deals with an antenna assembly of this type having one or more control inputs which permit one to rapidly electrically change the type of dual orthogonal polarization (e.g., by selecting linear polarization, circular polarization or elliptical polarization).

Microstrip patch antennas of various types as well as microstrip transmission lines, power dividers, phase shifters, etc., are now well known elements to those skilled in the art of microstrip antenna design. In general, such microstrip radiator patches comprise shaped conductive areas often formed by photo-chemical etching processes similar to those used for forming printed circuit boards. The shaped radiator and transmission line surfaces are generally disposed (by a thin dielectric sheet or layer) above an underlying ground or reference conductive surface cladded to the other side of the dielectric sheet. The dielectric sheet spacing the radiator patch from the underlying ground plane is typically on the order of less than one-tenth wavelength in thickness at the operating frequency of the antenna structure.

More particularly, circularly polarized antenna radiator patches and associated transmission lines as well as linearly polarized microstrip antenna patches are both well known. For example, both types of microstrip antenna structures are disclosed in U.S. Pat. No. Re. 29,911, commonly assigned herewith. Such structures may also be formed in monolithic integrated circuit format as disclosed in commonly assigned copending U.S. patent application Ser. No. 207,289 filed Nov. 17, 1980 naming Messrs. Munson and Stockton as inventors.

Dual polarized high gain antennas are widely used in satellite communications with frequency re-use capability. Channel capacity is doubled by using the same frequency with two mutually orthogonal polarizations. Typically horizontal and vertical or left and right circular polarizations are used. However, for optimum channel gain, it is desirable to be able to change the antenna polarizations at will and yet maintain orthogonality between the two polarizations. Such a capability has potential application in satellite communications where rapid changes of polarization are required while communicating with different satellites from a single earth station or with different earth stations communicating with a single satellite. There may be many other applications as well for such capability as will be appreciated by those in the art.

There are a number of prior antenna assemblies which permit polarization adjustments or which are capable of radiating differently polarized signals. For example, in addition to those already referenced, the following prior issued U.S. patents are referenced:

U.S. Pat. No. 3,478,362—Ricardi et al (1969)
U.S. Pat. No. 3,665,480—Fassett (1972)
U.S. Pat. No. 4,067,016—Kaloi (1978)
U.S. Pat. No. 4,125,837—Kaloi (1978)
U.S. Pat. No. 4,125,838—Kaloi (1978)
U.S. Pat. No. 4,125,839—Kaloi (1978)

Ricardi et al teach a plate antenna with a polarization adjustment feature using a single input port power divider and phase shifter which apparently permits arbitrary polarization of the radiated r.f. fields. However, since there is but a single input port, there is no dual polarization capability.

Fassett teaches an annular slot antenna with stripline feed wherein adjustment of the relative phase and amplitude applied to the two strip conductor feeds is said to permit radiation from the annular slot into a waveguide of circular, elliptical or orthogonal linear polarizations. However, the technique there described for achieving such adjustable relative phase and amplitude feeds uses two variable attenuators (one for each feed line) as well as a variable phase shifter between the two feed lines. Not only does this arrangement use three controls, it uses only a single input port and thus does not provide simultaneous dual polarization.

The Kaloi references are representative of additional microstrip patch antenna structures which are said to be capable of circular, linear and/or elliptical polarizations.

However, none of these references teach a convenient microstrip implementation of an antenna assembly capable of rapid electrically controlled changes in polarization while still maintaining at all times dual orthogonal polarization between the radiated signals associated with each of two input ports.

We have now discovered a novel arrangement of microstrip circuits which does conveniently and efficiently permit rapid electrically controlled changes in polarization of dual orthogonally polarized radiation patterns from a microstrip radiator patch which patterns are respectively associated with dual input ports so as to permit double information carrying capacity on a single frequency channel. Furthermore, this novel assembly may be conveniently used as a building block in a phased array feed system for satellite communication reflector antennas.

In brief summary, the presently preferred exemplary embodiment of the invention comprises two cascaded 3-dB quadrature hybrid microstrip circuits with a controllable microstrip phase shifter connected in series with at least one output port of each of the hybrid circuits. The first quadrature hybrid circuit has a pair of input ports which permits the input of a pair of r.f. communication channel signals which are to be radiated. The output of the cascaded pair of quadrature-hybrid/phase-shifter microstrip circuits also provides a pair of r.f. output ports which are respectively connected to a pair of feed points on a dual polarized microstrip antenna (preferably substantially square or substantially circular in shape).

The radiated antenna outputs representative of the r.f. input signal to the first and second input ports are controlled by varying the settings of the controllable phase shifters (preferably via electronic control of switched diodes or the like). The first phase shifter (located between the cascaded quadrature hybrid circuits) determines the ratio of linear polarization components to be radiated from the antenna while the second phase shifter determines the relative phase difference between these two components. Accordingly, arbitrary (linear, circular or elliptical) polarizations may be excited by suitable choice of the two phase shifter settings.

However, in any event, the radiated fields due to r.f. inputs at the first input port are orthogonal to those radiated as a result of r.f. inputs to the second input port. The ability to rapidly change between different types of antenna polarizations by merely changing the settings of electronic phase shifters while always simultaneously and automatically maintaining complete orthogonality between the two polarizations of radiated signal components permits rapid changes as may be desired in a given communication environment between communication satellites, earth stations, etc.

The presently preferred embodiment comprising a cascaded set of quadrature hybrid microstrip circuits with interleaved controllable microstrip phase shifters feeding a dual polarized microstrip antenna structure is believed to provide a particularly advantageous overall microstrip antenna assembly. For example, it may be thought of as a dual polarized (e.g. square or circular) microstrip radiator patch element and a control feed network having two input ports and two output ports. The output ports of the control feed network excite the dual polarized microstrip element at two feed points (which may be at the periphery or edges of the microstrip or in recessed impedance matching notches or the like as will be appreciated).

When viewed in this perspective, the microstrip control feed network comprises two 3-dB quadrature hybrid microstrip circuits (so named because the power input at any one input port of the quadrature hybrid is split into half power or −3 dB levels at each of the two output ports of the quadrature hybrid) and two electronic phase shifters, one of which is disposed at an output port of each of the cascaded quadrature hybrids. The polarization of radiated fields excited by the inputs to the control feed network are controlled by varying the settings of the phase shifters. The first phase shifter (located between the quadrature hybrid circuits) determines the ratio of component linear polarizations excited while the second phase shifter (interposed between the last quadrature hybrid and the microstrip radiator patch) determines the relative phase difference between the component linear polarizations. Accordingly, an arbitrary polarization (e.g., linear, circular or elliptical) may be excited by a suitable choice of the two phase shifter settings. For any given arbitrary choice of polarization, the fields radiated due to the r.f. inputs presented at the two input ports of the control feed network always remain orthogonal to one another.

The control feed network and microstrip radiator element may all be fabricated in a single layer using microstrip or monolithic integrated circuit construction techniques. The phase shifters may be of any conventional type compatible with microstrip construction. In a two-layer version of construction, the microstrip radiator might be excited from beneath the ground or reference plane which, together with the microstrip radiator patch element, defines the radiating apertures for the radiated fields.

These as well as other objects and advantages of this invention will be better understood by carefully reading the following detailed description of the presently preferred exemplary embodiment of this invention taken in conjunction with the accompanying drawings, of which:

Figure 4:
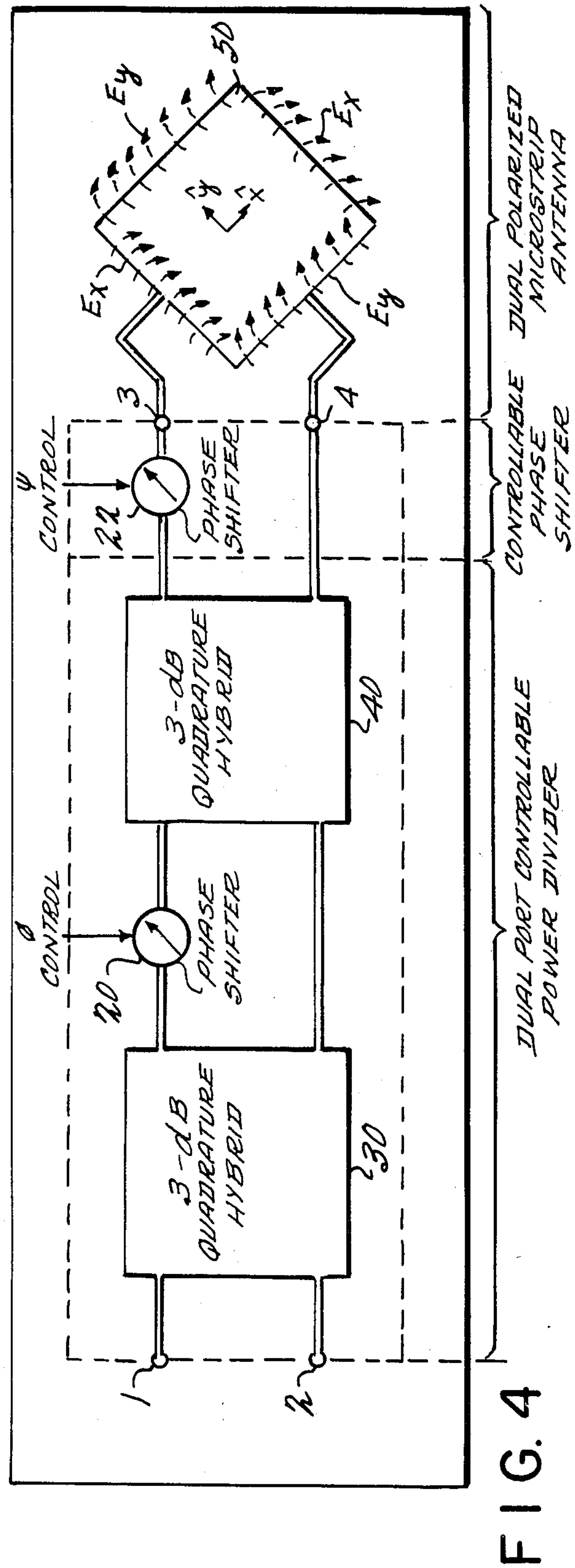
Figure 5:
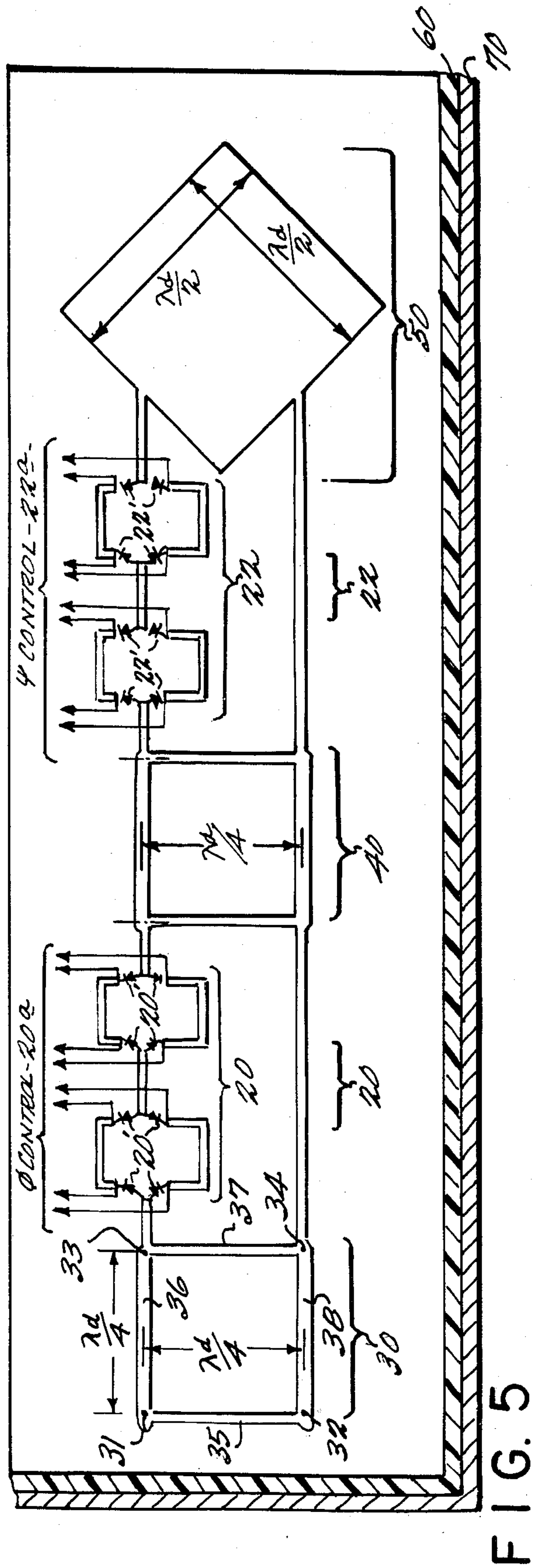

FIG. 4 is a partially schematic depiction of the presently preferred exemplary embodiment of this invention where a microstrip control feed network having dual input/output ports (e.g. a pair of controllable phase shifters interposed between cascaded 3-dB quadrature hybrid circuits) feeds a dual polarized microstrip antenna patch; and FIG. 5 is a somewhat less schematic depiction of the exemplary embodiment shown in FIG. 4 showing more of the actual structure typically associated with 3-dB quadrature hybrid microstrip circuits and schematically depicting at least one diode switch in association with each of the controllable phase shifters.

Figure 1:
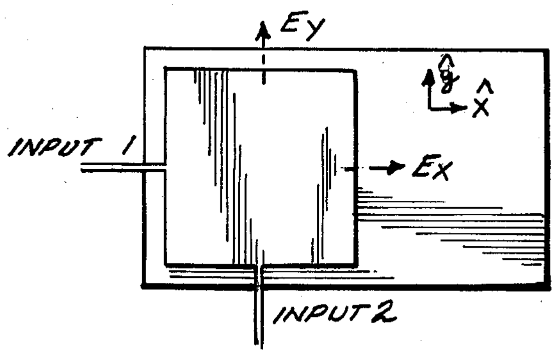
FIG. 1 (PRIOR ART)
FIG. 1 depicts a known prior art dual linear polarized microstrip radiator patch assembly.

It is well known that a square or a circular microstrip element may be excited to radiate two orthogonal linear polarizations ($\vec{x}E_x$ and $\vec{y}E_y$ in FIG. 1) whose complex amplitudes may be controlled independently. In FIG. 1, microstrip feed line 1 will excite x-oriented polarization and feed line 2 will excite y-oriented polarization.

Figure 2:
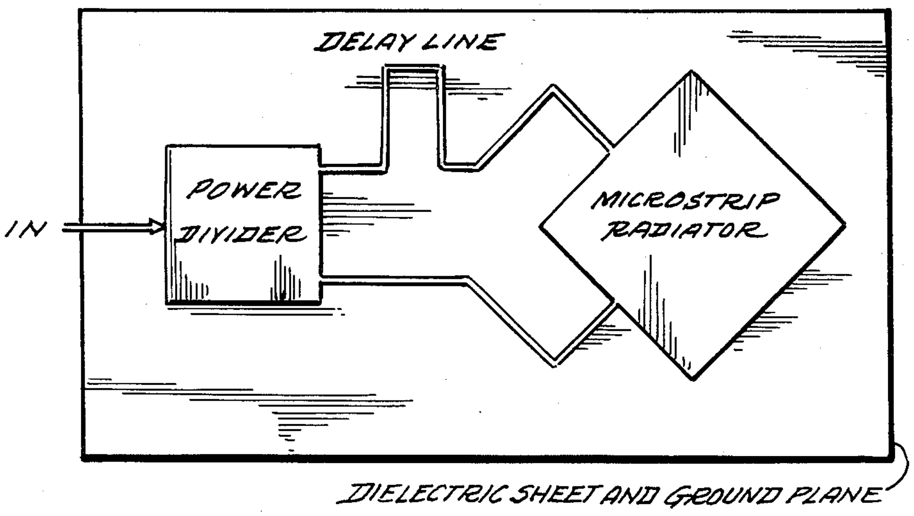
FIG. 2 (PRIOR ART)
FIG. 2 represents a known prior art microstrip radiator patch assembly capable of achieving arbitrary polarization.

An arbitrary polarization may be obtained by an appropriate combination of x and y polarizations as shown in FIG. 2. However, one drawback of this scheme is that there is no active control of the radiated polarization. Also there is no dual polarization capability since there is only one input port.

Figure 3:
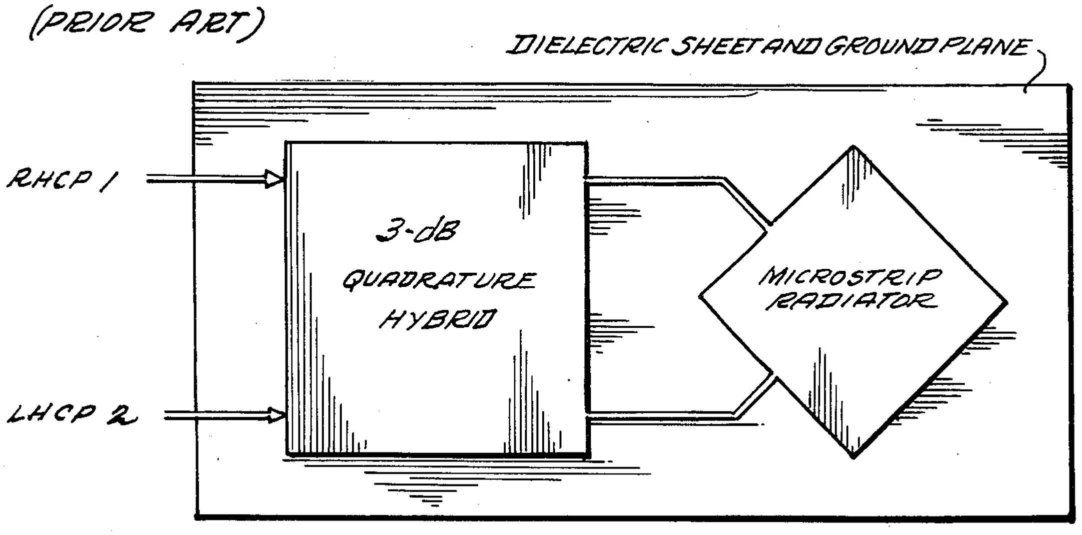
FIG. 3 (PRIOR ART)
FIG. 3 depicts a known prior art dual polarized microstrip radiator patch assembly with a 3-dB quadrature hybrid feeding network capable of achieving either right-hand circularly polarized (RHCP) or left-hand circularly polarized (LHCP) radiated fields.

It is also known to excite right-hand and left-hand circularly polarized fields by means of a 3-dB quadrature hybrid as shown in FIG. 3. Here ports 1 and 2 will excite right-hand (RHCP) and left-hand (LHCP) circular polarizations, respectively.

Thus, there are known simple means of obtaining either dual linear polarizations (FIG. 1) or dual circular polarizations (FIG. 3).

It is also known that an arbitrarily polarized wave may be obtained by appropriate combination of two orthogonal polarizations. The basic components could be linear, circular, or elliptical. However, for the exemplary embodiment, the two orthogonal linear polarizations $\vec{x}E_x$ and $\vec{y}E_y$ form the basic components.

What is needed, however, is a convenient, economical means of controlling the ratio and the relative phase difference between these components in a microstrip environment. We have discovered a simple means of doing this by using two 3-dB quadrature hybrids and two variable phase shifters as shown in FIG. 4.

Let $E_1$, $E_2$ be the input electric fields at ports 1 and 2 respectively given by $$E_1 = A_1 e^{j\omega t} \quad \text{(Equation 1)}$$

$$E_2 = A_2 e^{j\omega t} \quad \text{(Equation 2)}$$

Then it can be demonstrated that the fields $E_3$ and $E_4$ at points 3 and 4 are given by $$E_3 = (A_1 \sin\phi + A_2 \cos\phi) e^{j(\omega t + \pi + \phi + \psi)} \quad \text{(Equation 3)}$$

$$E_4 = (A_1 \cos\phi - A_2 \sin\phi) e^{j(\omega t + \pi + \phi)} \quad \text{(Equation 4)}$$

where $\phi$ and $\psi$ are phase shifts introduced by the first and second phase shifters. Let us consider the case where $A_2 = 0$. Then, $$|E_3/E_4| = \tan\phi \quad \text{(Equation 5)}$$

$$Arg(E_3/E_4) = \psi \quad \text{(Equation 6)}$$

Thus the magnitude of the ratio of two linear polarizations is controlled by varying $\phi$ and the relative phase difference between the two linear polarizations is controlled by varying $\psi$. Thus the polarization can be varied by varying $\phi$ and $\psi$ electronically (assuming, of course, that the phase shifters are of the type which can be electronically controlled).

Now it can also be demonstrated that the polarization of radiated fields due to an input at port 1 is orthogonal to the polarization of radiated fields due to input at port 2:

The vector field due to an input at port 1 is given, within a constant of proportionality, by $$\vec{E}_1(t)=\vec{x}E_{x1}\cos\omega t+\vec{y}E_{y1}\cos(\omega t+\delta_1) \quad \text{(Equation 7)}$$

where $$E_{x1}/E_{y1}=\tan\phi \quad \text{(Equation 8)}$$

$$\delta_1=\psi \quad \text{(Equation 9)}$$

The same input applied at port 2 will produce a vector field given by $$\vec{E}_2(t)=\vec{x}E_{x2}\cos(\omega t)+\vec{y}E_{y2}\cos(\omega t+\delta_2) \quad \text{(Equation 10)}$$

where $$E_{x2}/E_{y2}=\cos\phi \quad \text{(Equation 11)}$$

$$\delta_2=\psi+\pi \quad \text{(Equation 12)}$$

From equations 7–12 we find that $$E_{x1}/E_{y1}=E_{y2}/E_{x2}$$

and $$\delta_1-\delta_2=\pi$$

Hence, $\vec{E}_1$ and $\vec{E}_2$ represent two orthogonal polarizations [J. S. Hollis, T. J. Lyon, and L. Clayton, Jr., *Microwave Antenna Measurements,* Ch. 3, P. 3B.4, Scientific Atlanta, Inc., Atlanta, Ga., 1970.]

The combination of microstrip radiator, hybrids, and phase shifters shown in FIG. 4 can be thought of as an element module since all these components may be fabricated in a single layer using conventional printed circuit fabrication techniques.

Incorporation of amplifiers into the phase shifter circuits may be desired to compensate for the finite losses to be expected in the hybrids and phase shifters.

The controllable phase shifter shown in FIGS. 4 and 5 may be of any conventional design compatible with microstrip implementation. Such phase shifters typically include electronically controlled diode switches and/or FET switches and the like and are well known in the art. Some examples of such electronically controlled phase shifters may be found in the following prior art publications:

1. "Diode Phase Shifters for Array Antennas" by Joseph F. White, IEEE Transactions on Microwave Theory and Techniques, Volume MTT-22, No. 6, June 1974; and 2. "Broadband Diode Phase Shifters" by Robert V. Garver, Report HDL-Tr-1562, August 1971, Harry Diamond Laboratories, Washington, D.C., 20438.

First and second phase shifters 20 and 22 have been shown only schematically in FIGS. 4 and although associated switching diodes 20' and 22' have also been schematically depicted in FIG. 5 so as to be slightly more complete. As depicted in both of these Figures, there is conventionally at least one electronic control terminal 20*a* and 22*a* respectively associated with such electronically controlled phase shifters to bias a diode switch "on" or "off". For example, there may be an array of switching diodes which are controlled by an array of binary computer generated signals presented to a corresponding array of control terminals 20*a* and/or 22*a* associated respectively with the phase shifters 20 and 22. Since the details of such phase shifters are believed well known in the art, no further detailed description is believed necessary.

The first and second 3-dB quadrature hybrids 30 and 40 are shown only schematically in FIG. 4. Once again, these microstrip structures are quite well known by those skilled in the art and thus do not need much further description. Nevetheless, they are depicted in somewhat more detail in FIG. 5. As will be seen, the quadrature hybrid 30 comprises a pair of input terminals (or points or ports) 31, 32 and a pair of output terminals (or points or ports) 33, 34 all of which are sequentially interconnected in a closed r.f. circuit by an r.f. transmission path comprising legs 35, 36, 37 and 38 each of which is a fixed one-fourth electrical wavelength path to produce fixed one-fourth wavelength relative phase shifts between the pair of input terminals 31, 32, between the pair of output terminals 33, 34 and between adjacent input/output terminals 31, 33 and 32, 34. Typically legs 35, 37 may be of 50 ohm r.f. impedance and legs 36, 38 may be of 33 ohm r.f. impedance if the remainder of the assembly is designed for use of 50 ohm r.f. impedance transmission lines. As should be appreciated, a similar arrangement is included in the second 3-dB quadrature hybrid microstrip circuit 40.

The distance between the cascaded quadrature hybrid circuits 30 and 40 is not critical so long as it provides sufficient space for the interposed and interconnected phase shifter 20 as should be appreciated. Similarly, the distance between quadrature hybrid circuit 40 and the microstrip radiator 50 is not critical so long as sufficient space is available to accommodate phase shifter 22. Of course, neither of these distances should be unnecessarily extended as will be appreciated.

In FIG. 5 only two bits of a typical switched line phase shifter are shown. In practice there will be a number of bits typically 90°, 45°, 22.5°, 11.25° . . . and so on. The resolution increases as the number of bits is increased. Further, the type of microstrip phase shifter is not limited to the type shown. The phase shifters may be of other types. Also, the control elements may not necessarily be diodes. FET's (Field Effect Transistors) may also be used as the control elements. FET's have the added advantage of providing gain to compensate for the loss in the microstrip line. Varactor diodes may also be used to provide continuous rather than discrete variation in phase shift. Since such phase shifters are well known in the art, no further description is here needed.

There are also other types of microstrip hybrids than the commonly used 3-dB type shown in FIG. 5. In particular, Lang couplers and planar microstrip hybrids have real estate advantages over the type of hybrid shown in FIG. 5. Many such forms of phase shifters and hybrids are well known in the art and may be used in different embodiments of this invention adapted to different particular applications.

As earlier mentioned, the dual polarized microstrip radiator patch 50 is preferably of a substantially square or cicular shape in accordance with the teachings of the commonly assigned U.S. Pat. No. Re. 29,911 and/or which is capable of producing either left or right-hand circular or elliptical polarization in its radiated fields.

As also earlier mentioned, in the preferred exemplary embodiment, it is preferable to form as much of the quadrature hybrid and controllable phase shifter circuits as possible in microstrip format so that it might be formed integrally and in conjunction with the microstrip radiator patch 50. Such photo-chemically etched shaped conductive surfaces are typically cladded to the top of a dielectric sheet 50 which maintains the assembly spaced a fairly short distance (i.e., less than about one-tenth wavelength at the intended antenna operating frequency) above an underlying reference conductive surface 70 (which may typically also be cladded to the other side of the dielectric sheet 60).

As will be appreciated, a plurality of the r.f. antenna assemblies as shown in FIG. 5 might be formed on one or more dielectric sheets 60 so as to form the building blocks of a larger phased antenna array.

Although only one presently preferred exemplary embodiment has been described in detail above, those skilled in the art will recognize that there are many possible variations and modifications which may be made in this exemplary embodiment while yet retaining many of the novel advantages and features of this invention. Accordingly, all such variations and modifications are intended to be included within the scope of the following claims.

What is claimed is:

1. An r.f. antenna assembly having dual r.f. input ports and respectively corresponding dual radiated fields with controllably variable orthogonal polarizations, said assembly comprising:

a controllable dual input r.f. power divider means having first and second r.f. inputs, first and second r.f. outputs and controllable means with at least one first control terminal for controllably dividing the ratios of r.f. power respectively input through each of said r.f. inputs and output through each of said r.f. outputs;

a controllable r.f. phase shifter means having at least one second control terminal and being connected to control the relative phase of at least one of said r.f. outputs and to thus controllably shift the relative phase relationship between said r.f. outputs; and a dual orthogonally polarized antenna means connected to receive the controllably power-divided and phase-shifted r.f. outputs from the controllable power divider and phase shifter and to radiate corresponding dual orthogonally polarized orthogonal radiated r.f. fields having respective dual orthogonal polarizations of substantially linear, circular or elliptical polarization as controlled by control inputs to said first and second control terminals.

2. An r.f. antenna assembly as in claim 1 wherein said controllable r.f. power divider means comprises:

a first quadrature hybrid circuit having a pair of input terminals and a pair of output terminals sequentially interconnected in a closed r.f. circuit by an r.f. transmission path producing fixed one-fourth wavelength relative phase shifts between its pair of input terminals, between its pair of output terminals and between its adjacent input and output terminals;

a second controllable phase shifter means having an r.f. input connected to at least one of the output terminals of the first quadrature hybrid and having an r.f. output controllably shifted in phase from the r.f. input of the phase shifter; and a second quadrature hybrid circuit also having a pair of input terminals and a pair of output terminals sequentially interconnected in a closed r.f. circuit by an r.f. transmission path producing fixed one-fourth wavelength relative phase shifts between each pair of its input terminals, between each pair of its output terminals and between its adjacent input and output terminals, at least one of the input terminals of the second quadrature hybrid circuit being connected to an r.f. output of the second controllable phase shifter means.

3. An r.f. antenna assembly as in claim 1 wherein said power divider means, said phase shifter means and said antenna means each comprise shaped r.f. microstrip conductors spaced less than one-tenth wavelength at the intended antenna operating frequency from an underlying reference conductor surface.

4. An r.f. antenna assembly as in claim 3 wherein said antenna means comprises a microstrip radiator patch of substantially square shape.

5. An r.f. antenna assembly as in claim 3 wherein said antenna means comprises a microstrip radiator patch of substantially circular shape.

6. An r.f. antenna assembly as in claim 3 wherein said controllable phase shifter means includes at least one diode switch means which may be electrically controlled to alter the relative phase shift introduced by the phase shifter means.

7. A microstrip r.f. antenna assembly having dual r.f. inputs/outputs and controllably variable dual orthogonal polarization, said assembly comprising:

a conductive reference surface; and shaped conductive microstrip elements disposed above the reference surface by a distance substantially less than one-tenth wavelength at the intended antenna operating frequency, said shaped microstrip elements including (a) a dual polarized microstrip radiator having first and second feed points and capable of transmitting/receiving r.f. fields having orthogonally polarized components, (b) first and second quadrature hybrid circuits each having dual r.f. inputs/outputs and connected in cascade from the dual r.f. inputs/outputs of the entire assembly to the first and second feed points of the radiator, (c) a first controllably variable microstrip phase shifter interposed and connected between said first and second hybrid circuits, and (d) a second controllably variable microstrip phase shifter interposed and connected between said second hybrid circuit and said radiator.

8. A microstrip r.f. antenna assembly as in claim 7 wherein said microstrip radiator is of substantially square shape.

9. A microstrip r.f. antenna assembly as in claim 7 wherein said microstrip radiator is of substantially round shape.

10. A microstrip r.f. antenna assembly as in claim 7 wherein each of said first and second controllably variable microstrip phase shifters include at least one diode switch which may be electrically controlled to alter the phase shift introduced by its respectively associated phase shifter.

11. A microstrip r.f. antenna assembly having dual r.f. input ports and respectively corresponding dual radiated fields with controllably variable orthogonal polarizations, said assembly comprising:

first and second 3-dB quadrature hybrid microstrip circuits each having dual inputs and dual outputs;

first and second electrically controllable phase shifters; and a dual polarized microstrip radiator patch having two feed points, said quadrature hybrid circuits, controllable phase shifters and radiator patch being electrically interconnected in cascade with the first phase shifter being interposed between the first and second quadrature hybrid circuits and with the second phase shifter being interposed between the second quadrature hybrid circuit and the radiator patch.

12. A microstrip antenna assembly as in claim 11 wherein said radiator patch is of substantially square shape.

13. A microstrip antenna assembly as in claim 11 wherein said radiator patch is of substantially circular shape.

14. A microstrip antenna assembly as in claim 11 wherein each of said controllable phase shifters includes at least one diode switch means which may be electrically controlled to alter the relative phase shift introduced by that phase shifter.

15. A microstrip antenna assembly of shaped conductor surfaces spaced from a reference conductive surface, said assembly comprising:

a first fixed phase-shifting/power-dividing microstrip circuit having dual r.f. inputs and dual r.f. outputs;

a first controllable microstrip r.f. phase shifter having an input connected to one r.f. output of the first microstrip circuit and said first phase shifter also having an r.f. output;

a second fixed phase-shifting/power-dividing microstrip circuit having (a) a first r.f. input connected to an r.f. output of said first microstrip circuit, (b) a second r.f. input connected to the r.f. output of the first phase shifter and (c) dual r.f. outputs;

a second controllable microstrip r.f. phase shifter having an input connected to one r.f. output of the second microstrip circuit and said second phase shifter also having an r.f. output; and a dual polarized microstrip antenna radiator patch having (a) a first r.f. input connected to the r.f. output of said second phase shifter and (b) a second r.f. input connected to an r.f. output of said second microstrip circuit.

16. A microstrip r.f. antenna assembly as in claim 15 wherein said radiator patch is of substantially square shape.

17. A microstrip r.f. antenna assembly as in claim 15 wherein said radiator patch is of substantially circular shape.

18. A microstrip r.f. antenna assembly as in claim 15 wherein each of said controllable phase shifters includes at least one diode switch means which may be electrically controlled to alter the relative phase shift introduced by that phase shifter.

* * * * *